(12) United States Patent
Fukuhara

(10) Patent No.: US 7,215,388 B2
(45) Date of Patent: May 8, 2007

(54) ELECTRO-OPTICAL DEVICE AND METHOD OF MANUFACTURING THE SAME COMPRISING AN INTERLAYER INSULATING FILM HAVING A MULTI-LAYERED STRUCTURE

(75) Inventor: Keiji Fukuhara, Eniwa (JP)

(73) Assignee: Seiko Epson Corporation, Tokyo (JP)

( * ) Notice: Subject to any disclaimer, the term of this patent is extended or adjusted under 35 U.S.C. 154(b) by 196 days.

(21) Appl. No.: 10/897,079

(22) Filed: Jul. 23, 2004

(65) Prior Publication Data

US 2005/0052592 A1    Mar. 10, 2005

(30) Foreign Application Priority Data

Aug. 4, 2003    (JP)    ............... 2003-286208

(51) Int. Cl.
    G02F 1/136    (2006.01)
(52) U.S. Cl. .................... 349/43; 349/138; 349/38
(58) Field of Classification Search ............... 349/38, 349/39, 138, 43, 147, 143, 139
    See application file for complete search history.

(56) References Cited

U.S. PATENT DOCUMENTS

| | | | |
|---|---|---|---|
| 5,767,827 A * | 6/1998 | Kobayashi et al. ........... 345/87 |
| 6,335,772 B1 * | 1/2002 | Sato et al. .................... 349/44 |
| 6,344,888 B2 * | 2/2002 | Yasukawa .................... 349/113 |
| 6,420,200 B1 * | 7/2002 | Yamazaki et al. ............ 438/30 |
| 6,617,611 B2 | 9/2003 | Hasegawa et al. |
| 6,878,594 B2 * | 4/2005 | Suzuki et al. ............... 438/288 |
| 6,905,903 B2 | 6/2005 | Hasegawa et al. |
| 2004/0084775 A1 * | 5/2004 | Sugino et al. .............. 257/758 |
| 2005/0197031 A1 | 9/2005 | Yamazaki et al. |
| 2005/0206313 A1 | 9/2005 | Yamazaki et al. |
| 2005/0208863 A1 | 9/2005 | Yamazaki et al. |

FOREIGN PATENT DOCUMENTS

| | | |
|---|---|---|
| JP | 07-135204 | 5/1995 |
| JP | A-2001-52864 | 2/2001 |
| KR | A-2001-0062680 | 7/2001 |

* cited by examiner

*Primary Examiner*—Thoi V. Duong
(74) *Attorney, Agent, or Firm*—Oliff & Berridge PLC

(57) ABSTRACT

To provide an electro-optical device capable of reducing the likelihood of preventing moisture from permeating into a laminated structure formed on a substrate, in particular, thin film transistors that constitute the laminated structure and of performing a stable operation, and/or electro-optical device includes data lines, scanning lines, thin film transistors including semiconductor layers, and pixel electrodes to which image signals are supplied by the data lines through the thin film transistors, on a substrate. The electro-optical device may include an interlayer insulating film arranged between the data lines and the pixel electrodes, and a passivation film arranged on the surface of the interlayer insulating film.

12 Claims, 11 Drawing Sheets

F I G. 1
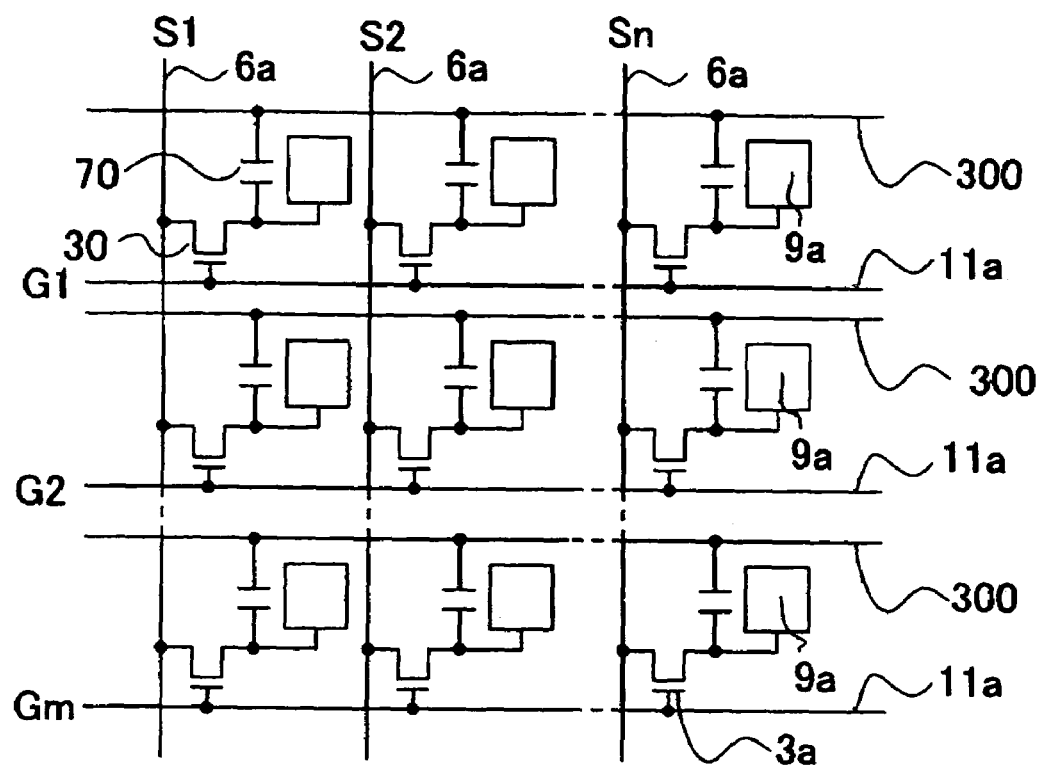
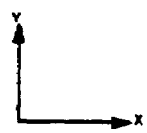

F I G. 2
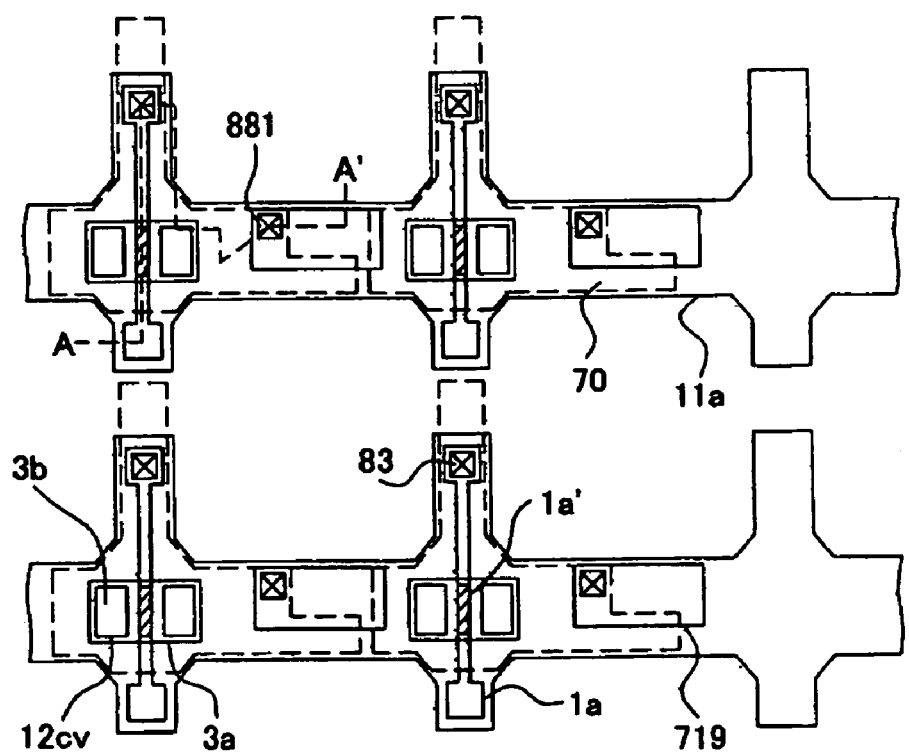
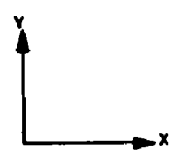

PROCESS (1)

PROCESS (2)

PROCESS (3)

PROCESS (4)

PROCESS (5)

ELECTRO-OPTICAL DEVICE AND METHOD OF MANUFACTURING THE SAME COMPRISING AN INTERLAYER INSULATING FILM HAVING A MULTI-LAYERED STRUCTURE

BACKGROUND OF THE INVENTION

1. Field of Invention

The present invention relates to an electro-optical device, such as an active-matrix-driving liquid crystal device, an electrophoresis device, such as electronic paper, an electroluminescent (EL) display device, and a device including an electron emission element, such as a field emission display and a surface-conduction electron-emitter display, and to methods of manufacturing the same. Also, the present invention relates to an electronic apparatus including the electro-optical device.

2. Description of Related Art

In the related art, electro-optical devices capable of active-matrix-driving have been disclosed. These electro-optical devices include pixel electrodes arranged on a substrate in a matrix, thin film transistors (TFT) connected to each of the pixel electrodes, and data lines and scanning lines connected to the TFTs and provided in parallel in column and row directions.

The related art electro-optical device may include a counter substrate that faces the substrate, counter electrodes that face the pixel electrodes on the counter substrate, and a liquid crystal layer interposed between the pixel electrodes and the counter to display images. The alignment of liquid crystal molecules in the liquid crystal layer appropriately changes according to a predetermined potential difference between the pixel electrodes and the counter electrodes, such that the transmittance of light that passes through the liquid crystal layer changes to display images. Two-level electric potential which fluctuates to plus side and minus side with respect to certain electric potential as an intermediate value (hereinafter, common electric potential), may be supplied to the counter electrodes in order to prevent the liquid crystal molecules from deteriorating.

In such a related art electro-optical device, various components, such as the above-mentioned thin film transistors, scanning lines, data lines, and pixel electrodes are constructed on the substrate to form a laminated structure. In this case, it is necessary that the thin film transistors be electrically connected to, the pixel electrodes, the scanning lines, and the data lines. However, it is necessary that the scanning lines and the pixel electrodes, or the scanning lines and the data lines be electrically insulated from each other. In this point of view, interlayer insulating films are commonly included between the various components in the laminated structure. A boron silicate glass (BSG) film may be used as such an interlayer insulating films.

SUMMARY OF THE INVENTION

However, the electro-optical device according to the related art technology is subject to the following problems. The interlayer insulating films as part of the laminated structure can be formed by various methods and of various materials. For example, since a chemical mechanical polishing (CMP) process is performed on the surfaces of the interlayer insulating films in order to planarize the surfaces of the interlayer insulating films, a non-silicate glass (NSG) film mainly made of $SiO_2$ may be formed as the interlayer insulating films by a plasma CVD method.

However, the NSG film commonly has week moisture resistance. Thus, the degree to which moisture, such as vapor included in the environment where the electro-optical device is placed, diffuses into or permeates into the inside of the laminated structure, is large. When such a phenomenon occurs, the moisture that permeates into the inside of the laminated structure, reaches the thin film transistors, in particular, the semiconductor layers. As a result, the threshold voltage of the thin film transistors increases such that the characteristics of the thin film transistors deteriorate. When the moisture permeates into the inside of the laminated structure, due to the moisture or the deterioration in the characteristics of the thin film transistors, the common electric potential supplied to the counter electrodes changes and may deteriorate displayed images.

An exemplary aspect of the invention addresses or solves the above and/or other problems, and provides an electro-optical device that reduces the likelihood of or prevents moisture from permeating into thin film transistors that constitute part of a laminated structure constructed on a substrate to stably operate and a method of manufacturing the same. An exemplary aspect of the present invention also provides an electronic apparatus including the electro-optical device.

In order to address or solve the above problems, an electro-optical device is provided including data lines extending above a substrate; scanning lines extending to a direction intersecting the data lines; thin film transistors including semiconductor layers and gate electrodes to which scanning signals are supplied by the scanning lines; pixel electrodes to which image signals are supplied by the data lines through the thin film transistors; a plurality of interlayer insulating films arranged between the data lines, the thin film transistors, and the pixel electrodes; and a passivation film arranged on the surface of at least one interlayer insulating film among the plurality of interlayer insulating films.

In an electro-optical device of an exemplary aspect of the present invention, image signal are supplied from the data lines to the pixel electrodes. The supply of the image signals from the data lines to the pixel electrodes is stopped in accordance with the switching ON and OFF of the thin film transistors switching controlled by the scanning signals. Therefore, an active-matrix-driving can be performed. Also, according to an exemplary aspect of the present invention, a laminated structure composed of the data lines, the scanning lines, the thin film transistors, and the pixel electrodes is constructed. An interlayer insulating film is arranged on one or more components between arbitrary two components among the above components, such that the interlayer insulating film constitutes a part of the laminated structure. The specific forms of the laminated structure may vary.

According to an exemplary aspect of the present invention, in particular, as part of the interlayer insulating film or on the side of the surface of the interlayer insulating film, a passivation film is provided. Here, the passivation film is an insulating film having large hygroscopic capacity. Thus, it is possible to reduce or prevent moisture, such as vapor included in the environment where the electro-optical device is placed, from permeating into the inside of the laminated structure. Thus, it is possible to make the characteristics of the thin film transistors stable, or to make the common electric potential stable in the counter electrodes, and to provide an electro-optical device capable of performing a stable operation.

According to an exemplary aspect of the electro-optical device of the present invention, the passivation film includes a material which is in a stable state in reaction to water.

According to this aspect, the passivation film includes a film having an excellent hygroscopic capacity.

In an exemplary aspect of the electro-optical device of the present invention, the passivation film includes a boron silicate glass (BSG) oxide film or a phosphorus silicate glass (PSG) oxide film.

According to this aspect, since the passivation film includes the BSG oxide film or the PSG oxide film having an excellent hygroscopic capacity, such that the above-mentioned effects can be enhanced.

In another exemplary aspect of the electro-optical device of the present invention, the thickness of the passivation film is no less than 10 nm and no more than 100 nm.

According to this aspect, since the thickness of the passivation film is appropriately determined, it is possible to achieve the following effects. That is, when the thickness of the passivation film is less than 10 nm, since the amount of the particles of boron that significantly contribute to the hygroscopic capacity of the passivation film is reduced, it is not possible to enhance the above-mentioned effects. When the thickness of the passivation film is larger than 100 nm, since the (the transmittance) rate at which light passes through the laminated structure is reduced, the brightness of images may deteriorate. Thus, according to this aspect, it is possible to enhance the hygroscopic capacity of the passivation film and to prevent picture quality from deteriorating.

According to another aspect of the electro-optical device of the present invention, the amount of boron (B) in the BSG oxide film is no less than 1 percent by weight and no more than 7 percent by weight.

According to this aspect, since the amount of boron in the passivation film is set appropriately, it is possible to achieve the following effects. When the amount of boron in the passivation film is less than 1 percent by weight, since the amount of the particles of boron that significantly contribute to the hygroscopic capacity of the passivation film, is reduced, it is not possible to enhance the above-mentioned effects. When the amount of boron in the passivation film is more than 7 percent by weight, since the amount of the particles of boron is increased, boron is precipitated and the precipitates thereof are projected on images to deteriorate the picture quality of the images. Thus, according to this aspect, it is possible to enhance the hygroscopic capacity of the passivation film and to reduce or prevent the picture quality from deteriorating.

In another exemplary aspect of the electro-optical device of the present invention, a first interlayer insulating film is provided and serves as the interlayer insulating film on which the pixel electrodes are laminated. The passivation film is arranged on the surface of the first interlayer insulating film.

According to this aspect, since the passivation film is arranged near the pixel electrodes commonly positioned in the vicinity of the outermost surface of the laminated structure, it is possible to reduce or prevent moisture from permeating into the entire laminated structure.

According to this aspect, the planarization process may be performed on the surface of the first interlayer insulating film.

In such a structure, the planarization process, such as the CMP process, is performed on the surface of the first interlayer insulating film. In order to perform the CMP process, the first interlayer insulating film may be mainly made of $SiO_2$, and it is more preferable that the first interlayer insulating film be made of only $SiO_2$. However, the hygroscopic capacity of the first interlayer insulating film made of $SiO_2$ is relatively small.

However, according to this structure, since the passivation film is arranged on the surface of the first interlayer insulating film, it is possible to reduce or prevent moisture from permeating into the inside of the laminated structure. Thus, even when the first interlayer insulating film is made of $SiO_2$, it does not matter. Since the planarization process is performed on the surface of the first interlayer insulating film, it is possible to make the pixel electrodes flat and to make the alignment film formed on the pixel electrodes flat, such that a rubbing process can be appropriately performed. Also, it is possible to reduce or prevent moisture from permeating. Thus, according to this aspect, it is possible to enhance the above-mentioned effects.

Another exemplary aspect of the electro-optical device of the present invention includes storage capacitors electrically connected to the thin film transistors and to the pixel electrodes, and capacitor wiring lines to supply fixed electric potential to the storage capacitors. The plurality of interlayer insulating films include a second interlayer insulating film on which the capacitor wiring lines are laminated, under the first interlayer insulating film, and a third interlayer insulating film on which the data lines are laminated, under the second interlayer insulating film. The passivation films are arranged on two or more surfaces of the surface of the first interlayer insulating film, the surface of the second interlayer insulating film, and the surface of the third interlayer insulating film.

According to this aspect, since it is possible to appropriately construct the laminated structure including the storage capacitors, it is possible to enhance the aperture ratio and to miniaturize the electro-optical device.

According to this aspect, since the passivation film is arranged on two or more surfaces among the surfaces of the various interlayer insulating films that constitute the laminated structure, it is possible to more effectively reduce or prevent moisture from permeating into the passivation film.

According to this aspect, the planarization process may be performed on the surface of the first interlayer insulating film and on the surface of the second interlayer insulating film. The passivation film may be arranged on the surface of the first interlayer insulating film and on the surface of the second interlayer insulating film.

According to such a structure, since the planarization process is performed on the upper and lower sides of the first interlayer insulating film, the first interlayer insulating film may be mainly made of $SiO_2$, and it is preferable that the first interlayer insulating film be made of only $SiO_2$. However, the hygroscopic capacity of the first interlayer insulating film made of $SiO_2$ is relatively small. According to this aspect, since the passivation film is formed on the surface of the first interlayer insulating film and on the surface of the second interlayer insulating film, it is possible to reduce or prevent moisture from permeating into the laminated structure.

According to the present aspect, since the planarization process is performed on the surface of the first interlayer insulating film on the upper and lower sides, it is possible to make the pixel electrodes flat and to make the alignment film formed on the pixel electrodes flat, such that it is possible to appropriately perform the rubbing process. Also, it is possible to reduce or prevent moisture from permeating. Thus, according to this aspect, it is possible to enhance the above-mentioned effects.

According to this aspect, the plurality of interlayer insulating films include a fourth interlayer insulating film on which the storage capacitors are laminated, under the third interlayer insulating film, and under which the thin film transistors are positioned, and contact holes to electrically connect the pixel electrodes to the thin film transistors through the third interlayer insulating film and the fourth interlayer insulating film, such that the passivation film may not be arranged on the surface of the fourth interlayer insulating film.

According to such a structure, the passivation film is not formed on the surface of the fourth interlayer insulating film through which the contact holes are formed. When the passivation film exists, a laminated structure composed of the third interlayer insulating film, the passivation film, and the fourth interlayer insulating film, in order from the above, is constructed. However, according to this aspect, a laminated structure is composed of the third interlayer insulating film and the fourth interlayer insulating film. In this case, in the former, when the contact holes are formed through the third and fourth interlayer insulating film, the passivation film is also passed through. However, in the latter, it is not necessary to pass through the passivation film. Also, in the former, the etching rate between the third interlayer insulating film and the passivation film is different from the etching rate between the passivation film and the fourth interlayer insulating film, such that it is not possible to appropriately form the contact holes. However, in the latter, the above-mentioned phenomenon does not occur. Thus, according to the present structure, it is possible to appropriately form the contact holes that pass through the third and fourth interlayer insulating films.

Also, according to this aspect, it is premised that the contact holes that pass through the third and fourth interlayer insulating films exist, which is true for the other interlayer insulating films. When it is necessary to form the contact holes that pass through the first interlayer insulating film and the second interlayer insulating film or the second interlayer insulating film and the third interlayer insulating film, it is possible to achieve the same effects by not providing the passivation film between the first interlayer insulating film and the second interlayer insulating film or between the second interlayer insulating film and the third interlayer insulating film.

An exemplary method of manufacturing an electro-optical device includes extending data lines above a substrate, extending scanning lines to a direction intersecting the data lines, forming thin film transistors including semiconductor layers and gate electrodes to which scanning signals are supplied by the scanning lines, forming pixel electrodes to which image signals are supplied by the data lines through the thin film transistors, forming a plurality of interlayer insulating films arranged between the data lines, the thin film transistors, and the pixel electrodes, and forming a passivation film on one or more interlayer insulating films among the plurality of interlayer insulating films.

According to this exemplary method of manufacturing the electro-optical device of an exemplary aspect of the present invention, it is possible to appropriately manufacture the electro-optical device of an exemplary aspect of the present invention.

According to an exemplary aspect of the method of manufacturing the electro-optical device of an exemplary aspect of the present invention, the passivation film is formed by a normal pressure chemical vapor deposition (CVD) method.

According to this aspect, it is possible to appropriately manufacture the passivation film at low cost.

According to an exemplary aspect of the method of manufacturing the electro-optical device of an exemplary aspect of the present invention, the interlayer insulating films are formed by a plasma CVD method.

According to this aspect, it is possible to appropriately manufacture a NSG film mainly made of $SiO_2$ and, preferably, made of only $SiO_2$. However, the hygroscopic capacity of the interlayer insulating films made of $SiO_2$ is relatively small. According to this aspect, since the passivation film is formed on the interlayer insulating films, it is possible to reduce or prevent moisture from permeating into the laminated structure. Thus it does not matter, even when the interlayer insulating films are made of $SiO_2$.

An exemplary aspect of the method of manufacturing the electro-optical device of an exemplary aspect of the present invention, includes patterning predetermined components on the interlayer insulating films, and forming the passivation film is performed after patterning the predetermined components.

According to this aspect, it is possible to appropriately manufacture the passivation film. The passivation film may have a thickness no less than 10 nm and no more than 100 nm as mentioned above with respect to the electro-optical device of an exemplary aspect of the present invention. However, in this case, when the etching process or the peeling process included in the patterning process is performed after forming the passivation film, the passivation film may be damaged or lost.

However, according to this aspect, when a process of forming predetermined components, such as the scanning lines, the data lines, the pixel electrodes, the storage capacitors, the circuit elements, and the wiring lines by patterning is performed, the process is performed after forming the passivation film. Thus, according to this aspect, it is possible to reduce or prevent the passivation film from being damaged or lost.

According to this aspect, the predetermined components may include the pixel electrodes.

According to such a structure, since the passivation film is formed on the pixel electrodes, the passivation film is positioned in the almost uppermost layer of the laminated structure. Thus, according to this structure, it is possible to reduce or prevent moisture from permeating into the entire laminated structure.

According to an exemplary aspect of a method to manufacture the electro-optical device of an aspect of the present invention, the interlayer insulating films have a multi-layered structure.

According to this aspect, the interlayer insulating films have the multi-layered structure, such as the silicon nitride film and the silicon oxide film, or the silicon oxide film obtained by the thermal oxidation and the silicon oxide film obtained by the CVD method. Thus, the interlayer insulating films may have various functions to construct an appropriate laminated structure.

An electronic apparatus according to an exemplary aspect of the present invention includes the first to third exemplary aspects of electro-optical devices of the present invention.

Since the electronic apparatus of an exemplary aspect of the present invention includes the above-mentioned electro-optical device according to an exemplary aspect of the present invention, it is possible to reduce or prevent moisture from permeating into the laminated structure, such that it is possible to make the common electric potential stable in the counter electrodes, and to make the characteristics of the thin film transistors stable. As a result, it is possible to realize various electronic apparatus, such as a projection-type display device, a liquid crystal TV, a mobile telephone, an electronic pocketbook, a word processor, a view finder type or monitor direct-view type video tape recorder, a workstation, a picture telephone, a POS terminal, and a touch panel, capable of performing a stable operation and of displaying high quality images.

The operation and advantages of the present invention will be described with reference to exemplary embodiments to be described later.

BRIEF DESCRIPTION OF THE DRAWINGS

FIG. 1 is a schematic of an equivalent circuit of various elements and wiring lines in a plurality of pixels formed in a matrix, which constitute an image display region of an electro-optical device;

FIG. 2 is a schematic of a plurality of pixel groups adjacent to each other on a TFT array substrate on which data lines, scanning lines, and pixel electrodes are formed, which shows only a lower portion (below the reference numeral 70 (storage capacitors) in FIG. 4);

DETAILED DESCRIPTION OF EXEMPLARY EMBODIMENTS

An exemplary embodiment of the present invention will now be described with reference to the drawings. According to the exemplary embodiment, an electro-optical device according to the present invention is applied to a liquid crystal device.

Structure of Pixel Portion

Figure 3:
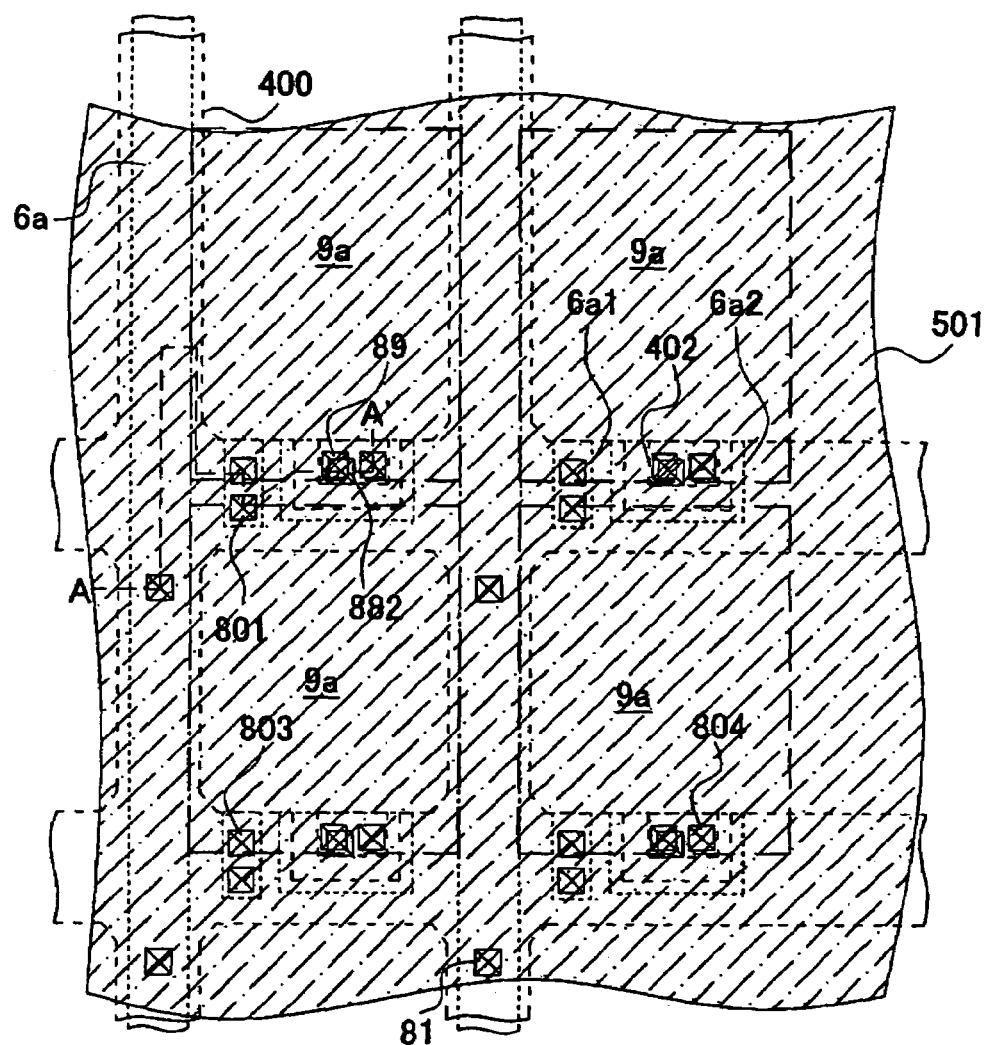
FIG. 3 is a schematic of the plurality of pixel groups adjacent to each other of the TFT array substrate on which the data lines, the scanning lines, and the pixel electrodes are formed, which shows only an upper portion (above the reference numeral 70 (storage capacitors) in FIG. 4)
Figure 4:
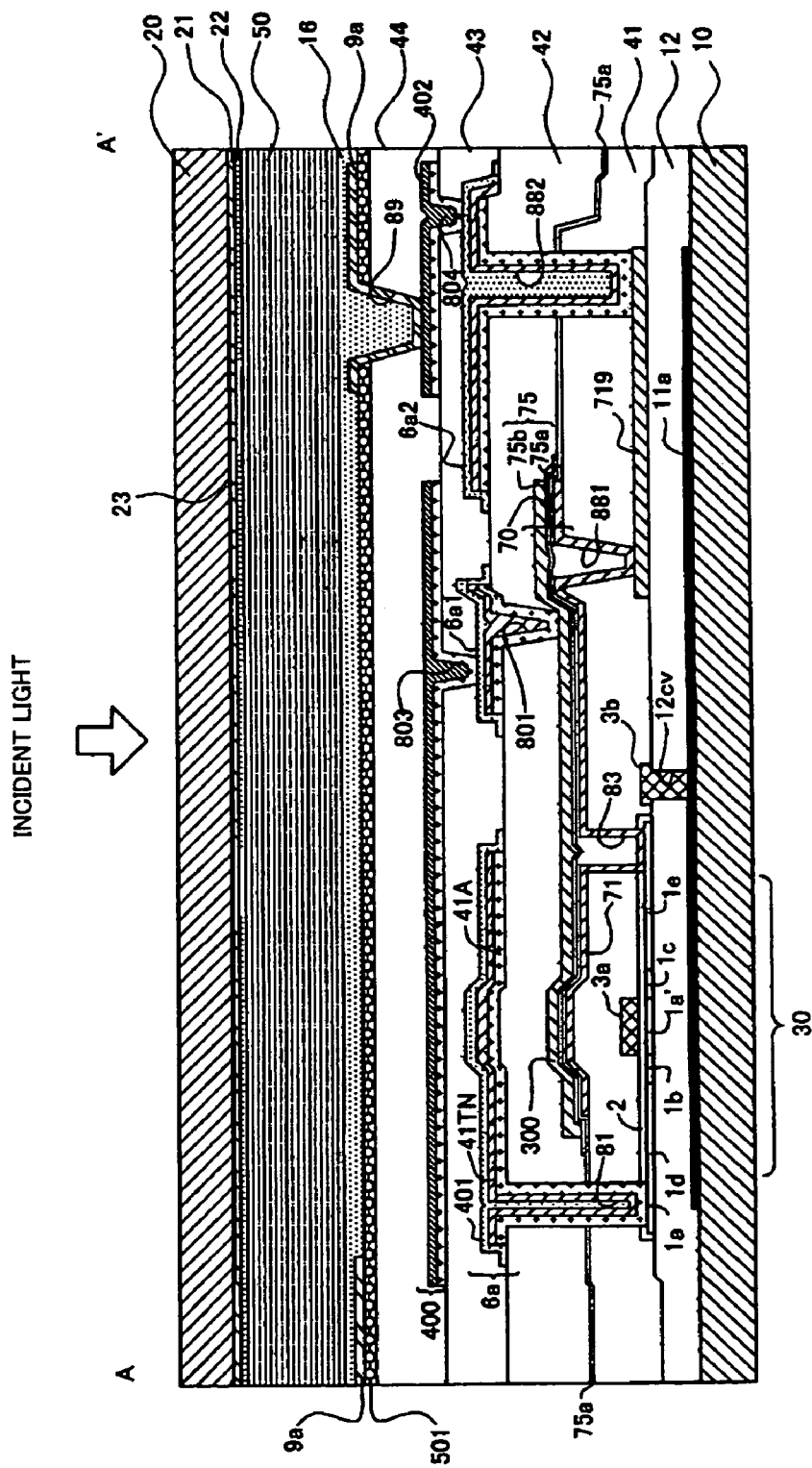
FIG. 4 is a sectional schematic taken along the plane A–A' when FIGS. 2 and 3 overlap.

The structure of a pixel portion of an electro-optical device according to an exemplary embodiment of the present invention will now be described with reference to FIGS. 1 to 4. Here, FIG. 1 is a schematic of an equivalent circuit of various elements and wiring lines in a plurality of pixels in a matrix that constitute an image display region of the electro-optical device. FIGS. 2 and 3 are schematics of a plurality of pixel groups adjacent to each other on a TFT array substrate on which data lines, scanning lines, and pixel electrodes are formed. Also, FIGS. 2 and 3 respectively illustrate a lower portion (FIG. 2) and an upper portion (FIG. 3) in a laminated structure to be described later. FIG. 4 is a sectional schematic taken along the plane A–A'0 in the case where FIGS. 2 and 3 overlap. In FIG. 4, the contraction scales of each layer and member are made to be different, to make each layer and member recognizable in the figure.

Hereinafter, after describing the basic structure of the electro-optical device according to the present exemplary embodiment, characteristic structures of the present exemplary embodiment will be described in detail later in section "Structure of Passivation Film".

Circuit Structure of Pixel Portion

In FIG. 1, pixel electrodes 9a and TFTs 30 to switch and control the pixel electrodes 9a are formed in a plurality of pixels in a matrix that constitutes an image display region of an electro-optical device according to the present exemplary embodiment. Data lines 6a to which image signals are supplied are electrically connected to the sources of the TFTs 30. The image signals S1, S2, . . . , and Sn written in the data lines 6a may be line-sequentially supplied in this order and may be supplied to respective groups each being composed of a plurality of adjacent data lines 6a.

Gate electrodes 3a are electrically connected to the gates of the TFTs 30. At a predetermined timing, scanning signals G1, G2, . . . , and Gm are line-sequentially applied to scanning lines 11a and the gate electrodes 3a as pulses in this order. The pixel electrodes 9a are electrically connected to the drains of the TFTs 30, and the switches of the TFTs 30, which are switching elements, are closed for a certain period, such that the image signals S1, S2, and Sn supplied from the data lines 6a are written at a predetermined timing.

The image signals S1, S2, . . . , and Sn of a predetermined level that are written in liquid crystal, an example of an electro-optical material, through the pixel electrodes 9a, are stored between counter electrodes formed on a counter substrate for a certain period. The alignment or order of the molecules of the liquid crystal changes according to the level of an applied voltage, such that light is modulated to display a grayscale. In a normally white mode, the transmittance of incident light is decreased in accordance with the voltage applied to each pixel unit. In a normally black mode, the transmittance of the incident light increases in accordance with the voltage applied to each pixel unit. Thus, light having contrast in accordance with the image signals is emitted from the electro-optical device.

Here, in order to reduce the likelihood or prevent the stored image signals from leaking, storage capacitors 70 are added in parallel to the liquid crystal capacitors formed between the pixel electrodes 9a and the counter electrodes. The storage capacitors 70 are provided in parallel to the scanning lines 11a and include fixed-electric-potential-side capacitor electrodes and the capacitor electrodes 300 fixed to electrostatic potential.

Specific Structure of Pixel Portion

The specific structure of the electro-optical device in which the above-mentioned circuit operation is realized by the data lines 6a, the scanning lines 11a, the gate electrodes 3a, and the TFTs 30 will now be described with reference to FIGS. 2 to 4.

First, in FIG. 3, the plurality of pixel electrodes 9a are provided on a TFT array substrate 10 in a matrix (the contours are marked with dotted lines) and the data lines 6a and the scanning lines 11a are provided along the vertical and horizontal boundaries of the pixel electrodes 9a. The data lines 6a have a laminated structure including aluminum, to be described later. The scanning lines 11a are made of, for example, a conductive poly-silicon film, etc. The scanning lines 11a are electrically connected to the gate electrodes 3a that face channel regions 1a' in the regions marked with upward-leaning oblique lines in semiconductor layers 1a through contact holes 12cv. The gate electrodes 3a are included in the scanning lines 11a. In the channel region 1a' of the portions where the gate electrodes 3a intersect the data lines 6a, the pixel switching TFTs 30, in which the gate electrodes 3a included in the scanning lines 11a are oppositely disposed thereto, are provided. Thus, the TFTs 30 (excluding the gate electrodes 3a) are positioned between the gate electrodes 3a and the scanning lines 11a.

Next, as illustrated in FIG. 4, which is a sectional schematic taken along the plane A–A' of FIGS. 2 and 3, the electro-optical device includes the TFT array substrate 10 made of a quartz substrate, a glass substrate, a silicon substrate, etc., and a counter substrate 20 made of the glass substrate or the quartz substrate, which faces the TFT array substrate 10.

On the side of the TFT array substrate 10, as illustrated in FIG. 4, the pixel electrodes 9a are provided. An alignment film 16, on which a predetermined alignment process is performed, is provided on the pixel electrodes 9a. The pixel electrodes 9a are made of, for example, a transparent conductive film, such as an indium tin oxide (ITO) film. On the side of the counter substrate 20, counter electrodes 21 are provided over the entire surface. An alignment film 22 on which a predetermined alignment process, such as a rubbing process is performed, is provided under the counter electrodes 21.

The counter electrodes 21 are made of a transparent conductive film, such as an ITO film like the above-mentioned pixel electrodes 9a.

An electro-optical material, such as liquid crystal, is filled in a space surrounded by a sealing material 52 (refer to FIGS. 11 and 12), to be described later, between the TFT array substrate 10 and the counter substrate 20 that face each other to form a liquid crystal layer 50. The liquid crystal layer 50 is given a predetermined alignment state by the alignment films 16 and 22 when an electric filed is not applied by the pixel electrodes 9a.

On the TFT array substrate 10, various components including the pixel electrodes 9a and the alignment film 16, form a laminated structure. As illustrated in FIG. 4, the laminated structure is composed of a first layer including the scanning lines 11a, a second layer including the TFTs 30 that include the gate electrodes 3a, a third layer including the storage capacitors 70, a fourth layer including data lines 6a, a fifth layer including capacitor wiring lines 400, and a sixth layer (the uppermost layer) including the pixel electrodes 9a and the alignment film 16 in order from the bottom. An underlying insulating film 12 is provided between the first layer and the second layer. A first interlayer insulating film 41 is provided between the second layer and the third layer. A second interlayer insulating film 42 is provided between the third layer and the fourth layer. A third interlayer insulating film 43 is provided between the fourth layer and the fifth layer. A fourth interlayer insulating film 44 is provided between the fifth layer and the sixth layer. Thus, it is possible to reduce the likelihood or prevent the above-mentioned components from being short circuited. Contact holes to electrically connect highly doped source regions 1d to the data lines 6a in the semiconductor layers 1a of the TFTs 30 are provided in the respective insulating films 12, 41, 42, 43, and 44. The respective components will now be sequentially described from the bottom. The above-mentioned structure, from the first layer to the third layer, is illustrated in FIG. 2 as a lower portion. From the fourth layer to the sixth layer is illustrated in FIG. 3 as an upper portion.

Laminated Structure: Structure of First Layer, such as Scanning Lines

First, The scanning lines 11a are provided in the first layer. The scanning lines 11a are made of metal monomer, an alloy, metal silicide, poly silicide including at least one high-melting-point metal, such as Ti, Cr, W, Ta, and Mo, and a laminate thereof, or conductive poly-silicon. The scanning lines 11a are patterned in stripes in plan view in the X-direction of FIG. 2. Specifically, the scanning lines 11a in stripes include main line portions that extend in the x-direction of FIG. 2, and protrusion portions that extend in the Y-direction of FIG. 2 to which the data lines 6a or the capacitor wiring lines 400 extend. The protrusion portions that extend from the adjacent scanning lines 11a are not connected to each other. Thus, each of the scanning lines 11a is isolated.

Laminated Structure: Structure of Second Layer such as TFTs

Next, the TFTs 30 including the gate electrodes 3a are provided as the second layer. As illustrated in FIG. 4, the TFTs 30 have a lightly doped drain (LDD) structure and include the above-mentioned gate electrodes 3a, the channel regions 1a' of the semiconductor layers 1a, which are made of a poly-silicon film and which have channels formed by the electric field from the gate electrodes 3a, insulating films 2 including a gate insulating film to insulate the gate electrodes 3a from the semiconductor layers 1a, and lowly doped source regions 1b, lowly doped drain regions 1c, highly doped source regions 1d, and highly doped drain regions 1e in the semiconductor layers 1a.

According to the present exemplary embodiment, relay electrodes 719 are formed on the second layer using the same film as the gate electrodes 3a. As illustrated in FIG. 2, each of the relay electrodes 719 is formed like an island, in plan view, to be positioned almost in the center of a side that extends in the X-direction of each of the pixel electrodes 9a. Since the relay electrodes 719 and the gate electrodes 3a are made of the same film, for example, when the gate electrodes 3a are made of the conductive poly-silicon film, the relay electrodes 719 are also made of the conductive poly-silicon film.

As illustrated in FIG. 4, the above-mentioned TFTs 30 may have the LDD structure. However, they may have an offset structure in which impurities are not implanted into the lightly doped source regions 1b and the lightly doped drain regions 1c. Self-aligned-type TFTs having highly doped source regions and highly doped drain regions formed by self-matching by implanting impurities with high concentration using the gate electrodes 3a as a mask may be used.

Laminated Structure: Structure Between First Layer and Second Layer, such as Underlying Interlayer Insulating Film The underlying insulating film 12 made of the silicon oxide film is provided on the scanning lines 11a or under the TFTs 30. The underlying insulating film 12 interlayer insulates the TFTs 30 from the scanning lines 11a. Also, the underlying insulating film 12 formed on the entire surface of the TFT array substrate 10 reduces the likelihood or prevents the characteristics of the pixel switching TFTs 30 from changing due to the roughness caused by abrading the surface of the TFT array substrate 10, and the dirt that remains after cleaning the TFT array substrate 10.

Contact holes 12cv are formed in the underlying insulating film 12 at both sides of the semiconductor layers 1a, in plan view in the direction of the channel length of the semiconductor layers 1a that extend along the data lines 6a, to be described later. Corresponding to the contact holes 12cv, Concave portions are formed under the gate electrodes 3a laminated above the contact holes 12cv. The gate electrodes 3a are formed to cover the entire region of the contact holes 12cv, such that sidewall portions 3b (the above-mentioned concave portions) integrated with the gate electrodes 3a, are provided in the gate electrodes 3a. Thus, as illustrated in FIG. 2, the semiconductor layers 1a of the TFTs 30 are covered from the side, in plan view, such that it is possible to prevent light from being incident on the covered portions.

The sidewall portions 3b are formed to cover the contact holes 12cv, and the lower ends thereof are connected to the scanning lines 11a. Here, the scanning lines 11a are formed in stripes, as mentioned above, such that the gate electrode 3a and the scanning line 11a in a certain row always have the same electric potential in the row.

Laminated Structure: Structure of Third Layer, such as Storage Capacitors

Subsequent to the above-mentioned second layer, in the third layer, the storage capacitors 70 are provided. The storage capacitors 70 are formed so that lower electrodes 71, serving as pixel-electric-potential-side capacitor electrodes and being connected to the highly doped drain regions 1e and the pixel electrodes 9a of the TFTs 30 face the capacitor electrodes 300, serving as fixed-electric-potential-side capacitor electrodes, with dielectric films 75 interposed therebetween. According to the storage capacitors 70, it is possible to enhance the potential storage characteristics of the pixel electrodes 9a. As illustrated in FIG. 2, the storage capacitors 70 according to the present exemplary embodiment do not reach light transmission regions almost corresponding to the regions in which the pixel electrodes 9a are formed. Since the storage capacitors 70 are accommodated in light shielding regions, the pixel aperture ratio of the entire electro-optical device remains large, such that it is possible to display brighter images.

The lower electrodes 71 are made of a conductive polysilicon film and function as the capacitor electrodes having the pixel electric potential. The lower electrodes 71 may be made of a single-layered film or a multi-layered film including metal or an alloy. The lower electrodes 71 have a function of relay connecting the pixel electrodes 9a to the highly doped drain regions 1e of the TFTs 30 as well as the functions of the pixel-electric-potential-side capacitor electrodes. Furthermore, the relay connection mentioned herein is performed through the relay electrodes 719.

The capacitor electrodes 300 function as the capacitor electrodes having the fixed electric potential of the storage capacitors 70. According to the present exemplary embodiment, in order to make the capacitor electrodes 300 have the fixed electric potential, the capacitor electrodes 300 are electrically connected to capacitor wiring lines (to be described later) 400 having the fixed electric potential. The capacitor electrodes 300 are made of metal monomer, an alloy, metal silicide, poly silicide including at least one high-melting-point metal, such as Ti, Cr, W, Ta, and Mo, and a laminate thereof, or preferably, tungsten silicide. Thus, the capacitor electrodes 300 reduce or prevent light from being incident on the TFTs 30 from above.

The dielectric films 75 are made of a relatively thin silicon oxide film having the thickness of about 5 to 200 nm, such as a high temperature oxide (HTO) film, or a low temperature oxide (LTO) film or a silicon nitride film. In order to increase the storage capacitors 70, the dielectric films 75 may be thinner as long as it is possible to achieve sufficient reliability.

According to the present exemplary embodiment, as illustrated in FIG. 4, the dielectric film 75 has a two-layered structure, such as a silicon oxide film 75a in the lower layer and a silicon nitride film 75b in the upper layer. The silicon nitride film 75b in the upper layer is patterned to be slightly larger than the lower electrode 71 of the pixel-electric-potential-side capacitor electrode to be received in a light shielding region (a non-opening region).

According to the present exemplary embodiment, the dielectric film 75 has a two-layered structure. However, if necessary the dielectric film 75 has a three-layered structure, such as a silicon oxide film, a silicon nitride film, and a silicon oxide film, or a laminated structure of three or more layers. The dielectric film 75 may have a single-layered structure.

Laminated Structure: Structure between Second Layer and Third Layer, such as First Interlayer Insulating Film A first interlayer insulating film 41 made of a silicate glass film, such as non-silicate glass (NSG), phosphorus silicate glass (PSG), boron silicate glass (BSG), boron phosphorus silicate glass (BPSG), a silicon nitride film, or a silicon oxide film, or preferably, NSG is formed on the TFTs 30 or the gate electrodes 3a, on the relay electrodes 719, and under the storage capacitors 70.

In the first interlayer insulating film 41, contact holes 81 to electrically connect the highly doped source regions 1d of the TFTs 30 to the data lines 6a, to be described later, are provided to pass through the second interlayer insulating film 42, to be described later. Also, in the first interlayer insulating film 41, contact holes 83 to electrically connect the highly doped drain regions 1e of the TFTs 30 to the lower electrodes 71 that constitute the storage capacitors 70 are formed as open holes. Furthermore, in the first interlayer insulating film 41, contact holes 881 to electrically connect the lower electrodes 71, serving as the pixel-electric-potential-side capacitor electrodes that constitute the storage capacitors 70, to the relay electrodes 719 are formed as open holes. Furthermore, in the first interlayer insulating film 41, contact holes 882 to electrically connect the relay electrodes 719 to the second relay electrodes 6a2, to be described later, are formed to pass through the second interlayer insulating film, to be described later.

Laminated Structure: Structure of Fourth Layer, such as Data Lines

Subsequent to the third layer, in the fourth layer, the data lines 6a are provided. As illustrated in FIG. 4, the data lines 6a have a three-layered structure, such as a layer made of aluminum (refer to the reference numeral 41A in FIG. 4), a layer made of titanium nitride (refer to the reference numeral 41TN in FIG. 4), and a layer made of silicon nitride (refer to the reference numeral 401 in FIG. 4) in order from the bottom. The silicon nitride film is patterned with a little larger size to cover the aluminum layer and the titanium nitride layer thereunder.

Also, in the fourth layer, capacitor wiring line relay layers 6a1 and the second relay electrodes 6a2 are formed of the same film as the data lines 6a. As illustrated in FIG. 3, they are not continuous with the data lines 6a on a plane, but are isolated from each other after being patterned in plan view. For example, when attention is paid to the data line 6a positioned on the leftmost side in FIG. 3, the almost quadrangular capacitor wiring line relay layers 6a1 and the almost quadrangular second relay electrode 6a2, whose area is slightly larger than that of the capacitor wiring line relay layer 6a1, are formed on the right side of the data line 6a.

Since the capacitor wiring line relay layers 6a1 and the second relay electrodes 6a2 are formed of the same film as the data lines 6a, they have a three-layered structure, such as the layer made of aluminum, the layer made of titanium nitride, and the layer made of plasma nitride film in order from the bottom.

Laminated Structure: Structure between Third Layer and Fourth Layer such as Second Interlayer Insulating Film The second interlayer insulating film 42, formed of the silicate glass film, such as NSG, PSG, BSG, and BPSG, the silicon nitride film, or the silicon oxide film, or preferably formed by a chemical vapor deposition (CVD) method using TEOS gas, is provided on the storage capacitors 70 and under the data lines 6a. In the second interlayer insulating film 42, the contact holes 81 to electrically connect the highly doped source regions 1d of the TFTs 30 to the data lines 6a and contact holes 801 to electrically connect the capacitor wiring line relay layers 6a1 to the capacitor electrodes 300 that are the upper electrodes of the storage capacitors 70 are formed as open holes. Furthermore, in the second interlayer insulating film 42, the contact holes 882 to electrically connect the second relay electrodes 6a2 to the relay electrodes 719, are formed.

Laminated Structure: Structure of Fifth Layer such as Storage Capacitors

Subsequent to the fourth layer, in the fifth layer, capacitor wiring lines 400 are provided. As illustrated in FIG. 3, the capacitor wiring lines 400 are provided in a matrix to extend in the X-direction and Y-direction of the drawing in plan view. Among the capacitor wiring lines 400, the portions that extend in the Y-direction of the drawing are particularly-wider than the data lines 6a to cover the data lines 6a. Also, each of the portions that extend in the X-direction of the drawing has a notch in the center of one side of each of the pixel electrodes 9a in order to secure regions in which the third relay electrodes 402 are formed.

In FIG. 3, at the corners of the intersections of the capacitor wiring lines 400 that extend in the X-direction and Y-direction, almost triangular portions are provided to cover the corners. Since the almost triangular portions are provided in the capacitor wiring lines 400, it is possible to effectively shield the semiconductor layers 1a of the TFTs 30 from light. The light that would otherwise be incident on the semiconductor layers 1a from the upper side in an inclined direction, is reflected by or absorbed into the triangular portions, such that the light does not reach the semiconductor layers 1a. Thus, it is possible to reduce or prevent light leakage current from being generated, thus displaying high quality images without flicker. The capacitor wiring lines 400 extend from the image display region 10a in which the pixel electrodes 9a are arranged to the vicinity thereof to be electrically connected to an electrostatic potential source and to have fixed electric potential.

In the fifth layer, the third relay electrodes 402 are formed of the same film as the capacitor wiring lines 400. The third relay electrodes 402 relay electrical connection between the second relay electrodes 6a2 and the pixel electrodes 9a through contact holes 804 and 89, to be described later. The capacitor wiring lines 400 and the third relay electrodes 402 are not continuous with each other on a plane but are isolated from each other after being patterned.

The capacitor wiring lines 400 and the third relay electrodes 402 have a two-layered structure, such as the layer made of aluminum as a lower layer and the layer made of titanium nitride as an upper layer.

Laminated Structure: Structure between Fourth Layer and Fifth Layer, such as Third Interlayer Insulating Film The third interlayer insulating film 43 is formed on the data lines 6a and under the capacitor wiring lines 400. In the third interlayer insulating film 43, contact holes 803 to electrically connect the capacitor wiring lines 400 to the capacitor wiring line relay layers 6a1 and contact holes 804 to electrically connect the third relay electrodes 402 to the second relay electrodes 6a2 are formed as open holes.

Laminated Structure: Structure of Sixth Layer and Structure between Fifth layer and Sixth layer, such as Pixel Electrodes Finally, in the sixth layer, as mentioned above, the pixel electrodes 9a are formed in a matrix. The alignment film 16 is formed on the pixel electrodes 9a. The fourth interlayer insulating film 44 is formed under the pixel electrodes 9a. In the fourth interlayer insulating film 44, contact holes 89 to electrically connect the pixel electrodes 9a to the third relay electrodes 402 are formed as open holes. The pixel electrodes 9a and the TFTs 30 are electrically connected to each other through the contact holes 89, the third relay layer 402, the contact holes 804, the second relay layers 6a2, the contact holes 882, the relay electrodes 719, the contact holes 881, the lower electrodes 71, and the contact holes 83.

Structure of Passivation Film

Figure 5:
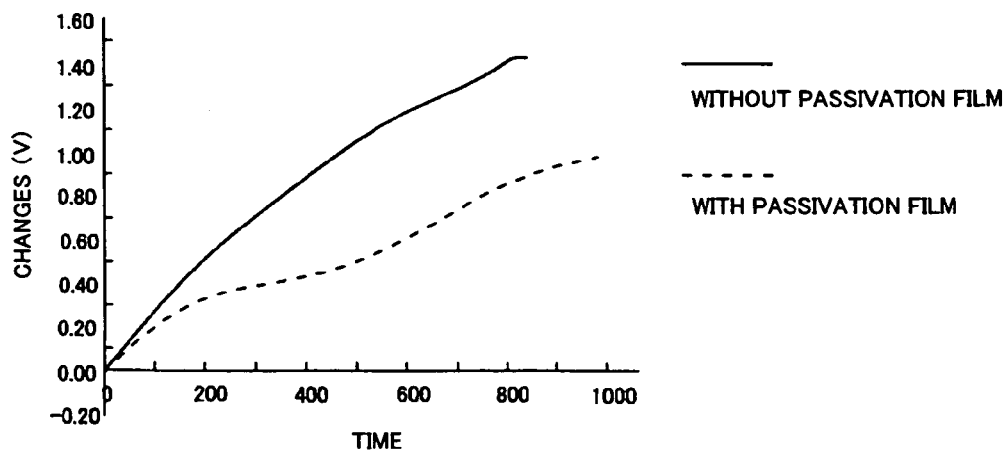
FIG. 5 is a graph illustrating the moisture resistance of the electro-optical device when a passivation film is included, and the moisture resistance of the electro-optical device when the passivation film is not included.

In the electro-optical device according to the present exemplary embodiment having the above-mentioned structure, various interlayer insulating films arranged between the components, such as the TFTs 30, the storage capacitors 70, and the pixel electrodes 9a, in particular, the fourth interlayer insulating film 44 will now be described in detail with reference to the respective drawings mentioned above and FIG. 5. FIG. 5 is a graph illustrating the moisture resistance of the electro-optical device when the passivation film to be described later is included, and the moisture resistance of the electro-optical device when the passivation film to be described later is not included.

First, in the electro-optical device according to the present exemplary embodiment, as mentioned above, the fourth interlayer insulating film 44 is formed under the pixel electrodes 9a and on the capacitor wiring lines 400. However, the fourth interlayer insulating film 44 is made of a non-silicate glass (NSG) film manufactured by a plasma CVD method using TEOS gas. A planarization process, such as a chemical mechanical polishing (CMP) process is performed on the surface of the fourth interlayer insulating film 44 such that the surface of the fourth interlayer insulating film 44 is planarized. Thus, as illustrated in FIG. 4, the pixel electrodes 9a and the alignment film 16 formed on the fourth interlayer insulating film 44 have planarized surfaces such that irregularity is not generated on the surfaces. Thus, it is possible to smoothly perform a rubbing process on the surface of the alignment film 16 to reduce the likelihood or prevent alignment failures from occurring due to the portions on which the rubbing process is not sufficiently performed. When the irregularity significantly exists on the surface of the alignment film 16, the portions on which the rubbing process is not sufficiently performed, may be generated.

The fourth interlayer insulating film 44 is made of the NSG film manufactured by the plasma CVD method, such that the fourth interlayer insulating film 44 can be easily CMP processed. According to the present exemplary embodiment, the third interlayer insulating film 43 under the fourth interlayer insulating film 44 is also made of the NSG film manufactured by the plasma CVD method. Furthermore, the surface of the third interlayer insulating film 43 is planarized like the fourth interlayer insulating film 44. Thus, the planarization of the pixel electrodes 9a, the alignment film 16, etc. is enhanced, such that it is possible to enhance the above-mentioned effects.

According to the present exemplary embodiment, in particular, as illustrated in FIG. 4, a passivation film 501 is formed between the fourth interlayer insulating film 44 and the pixel electrodes 9a. The passivation film 501 covers the hatching region illustrated in FIG. 3, specifically, the entire image display region in plan view.

The passivation film 501 is made of a boron silicate glass (BSG) oxide film. The thickness T of the passivation film 501 satisfies the condition 10 nm≦T≦100 nm. The amount of boron (B) WB in the passivation film 501 satisfies the condition 1 percent by weight≦WB≦7 percent by weight. The passivation film 501 also functions as an insulating film to reduce the likelihood or prevent the adjacent pixel electrodes 9a from being short circuited.

The electro-optical device according to the present exemplary embodiment includes such a passivation film 501 to achieve the following effects. That is, the passivation film 501 includes the BSG oxide film to achieve relatively excellent hygroscopic capacity. This is because, boron included in the BSG oxide film is relatively unstable. $B_2O_3$ generated by the reaction between boron and water is relatively stable, such that water that permeates into the BSG film easily reacts to boron. Furthermore, such a mechanism is found in a phosphorus silicate glass (PSG) oxide film (that is, phosphorus in the PSG oxide film reacts to water) and a passivation film that includes the PSG oxide film has relatively excellent hygroscopic capacity. Thus, the passivation film 501 may include the PSG oxide film instead of the BSG oxide film.

This can be confirmed by FIG. 5. FIG. 5 is a graph illustrating the moisture resistance of the electro-optical device when the passivation film 501 is included, and the moisture resistance of the electro-optical device when the passivation film 501 is not included. FIG. 5 illustrates changes in common electric potential (referred to as Lccom in the drawing) supplied to the counter electrodes 21, with the lapse of time, as a result of placing the electro-optical device (a dashed line in the drawing) with the passivation film 501, and the electro-optical device (a solid line in the drawing) without the passivation film 501, in the same environment where the temperature is 50° C., humidity is 90%, and the entire screen is displayed black. When the moisture resistance of the electro-optical device deteriorates, moisture permeates into the TFTs 30 to deteriorate the characteristics of the electro-optical device, or the common electric potential supplied to the counter electrodes 21 change. However, in FIG. 5, the degree of enhancement of the moisture resistance is measured by the degree of changes in the latter. In FIG. 5, changes in the common electric potential with the lapse of time in the electro-optical device with the passivation film 501 are smaller than changes in the common electric potential with the lapse of time in the electro-optical device without the passivation film 501, such that it is noted that the moisture resistance of the electro-optical device with the passivation film 501 enhanced. Furthermore, in FIG. 5, the thickness T of the passivation film 501 is 25 nm and the amount of boron WB is 2 percent by weight.

As mentioned above, according to the present exemplary embodiment, it is possible to reduce or prevent the moisture of the vapor included in the environment where the electro-optical device is placed, from permeating into the inside of the laminated structure. Thus, it is possible to make the characteristics of the TFTs 30 and the common electric potential of the counter electrodes 21 stable and to provide an electro-optical device capable of performing a stable operation.

According to the present exemplary embodiment, the surface of the fourth interlayer insulating film 44 is planarized by the CMP process and the fourth interlayer insulating film 44 is made of the NSG film manufactured by the plasma CVD method to appropriately cope with the planarization process, such that the hygroscopic capacity of the fourth interlayer insulating film 44 deteriorates. However, according to the present exemplary embodiment, the passivation film 501 is formed on the fourth interlayer insulating film 44. Thus, according to the present exemplary embodiment, it is possible to enhance the effects obtained by performing the planarization process without deteriorating the hygroscopic capacity.

Figure 6:
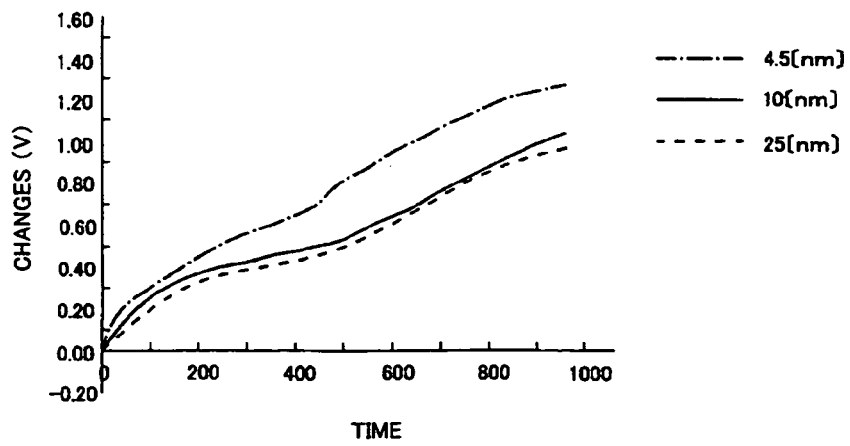
FIG. 6 is a graph illustrating the influence of the thickness of the passivation film on the enhancement of the moisture resistance of the electro-optical device.
Figure 7:
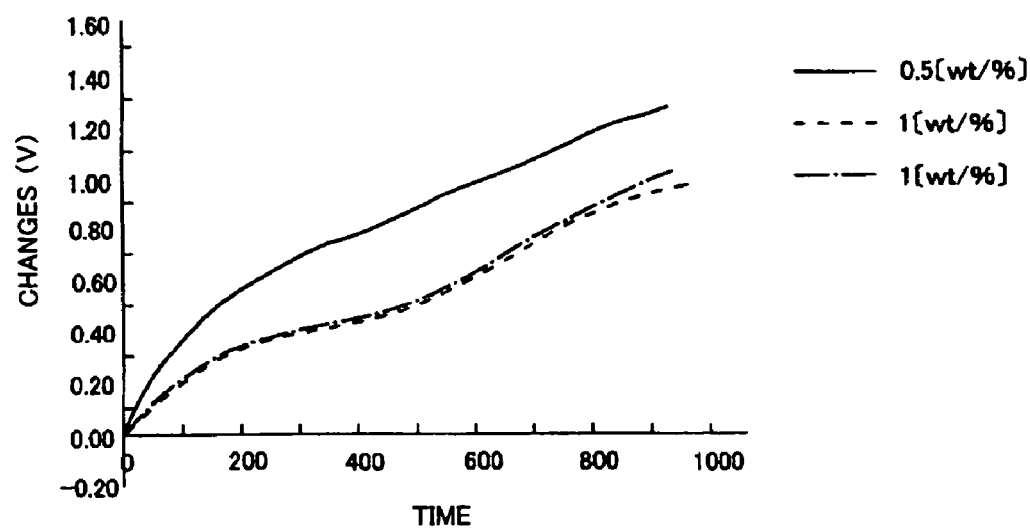
FIG. 7 is a graph illustrating the influence of the amount of boron in the passivation film on the enhancement of the moisture resistance of the electro-optical device.

Furthermore, according to the present exemplary embodiment, the thickness T of the passivation film 501 and the amount of boron WB are appropriately determined to obtain the following effects, which will be described with reference to FIGS. 6 and 7. FIG. 6 is a graph illustrating the influence of the thickness of the passivation film on the enhancement of the moisture resistance of the electro-optical device. FIG. 7 is a graph illustrating the influence of the amount of boron in the passivation film on the enhancement of the moisture resistance of the electro-optical device.

First, with respect to the thickness T, the graph illustrated in FIG. 6 is obtained. FIG. 6 illustrates changes in the common electric potential supplied to the counter electrodes 21 with the lapse of time, in the same environment where the temperature is 50° C., humidity is 90%, and the entire screen is displayed black, like in FIG. 5, using the thickness T of the passivation film 501 as parameters (4.5 and 10 and 25 nm).

As noted from FIG. 6, there exists a remarkable difference in changes in the common electric potential between the case in which the thickness T is 4.5 nm and the case in which the thickness T is 10 nm and 25 nm. That is, in the former, changes in the common electric potential significantly increase with the lapse of time and, in the latter, changes in the common electric potential slowly increase. Thus, the increase and decrease of the thickness T significantly affects the enhancement of the moisture resistance of the electro-optical device between the point of time where the thickness T is 4.5 nm and the point of time where the thickness T is 10 nm. When the thickness T is no less than 10 nm, the enhancement of the moisture resistance is stable to a certain degree. This is because the hygroscopic capacity of the BSG film is significantly affected by the presence of boron, specifically, the total amount of boron. In this point, the thickness T of the passivation film 501 is preferably no less than 10 nm.

Although not shown in the drawing, it does not mean that the thickness T is preferably as large as possible. When the thickness T is too large, the rate (the transmittance) at which light passes through the laminated structure is reduced, such that the brightness of images may deteriorate. According to the present inventors' investigation, in the point of view, the thickness T of the passivation film 501 is preferably no more than a certain degree, to be specific, no more than 100 nm.

As mentioned above, according to the present exemplary embodiment, when the thickness T of the passivation film 501 satisfies the condition 10 nm≦T≦100 nm, it is possible to enhance the moisture resistance of the electro-optical device, and to reduce or prevent picture quality of the electro-optical device from deteriorating.

Next, with respect to the amount of boron WB, the graph illustrated in FIG. 7, is obtained. To be specific, FIG. 7 illustrates changes in the common electric potential supplied to the counter electrodes 21 with the lapse of time, in the same environment where the temperature is 50° C., humidity is 90%, and the entire screen is displayed black, like in FIG. 5, using the amounts of boron WB in the passivation film 501 as parameters (0.5 and 1.0 and 2.0 percent by weight).

As noted from FIG. 7, there exists a remarkable difference in changes in the common electric potential between the case in which the amount of boron WB is 0.5 percent by weight and the case in which the amount of boron WB is 1.0 percent by weight and 2.0 percent by weight. In the former, changes in the common electric potential significantly increase with the lapse of time and, in the latter, changes in the common electric potential slowly increase. Thus, the increase and decrease of the amount of boron WB significantly affects the enhancement of the moisture resistance of the electro-optical device between the point of time where the amount of boron WB is 0.5 percent by weight and the point of time where the amount of boron WB is 1.0 percent by weight. When the amount of boron WB is no less than 1.0 percent by weight, the enhancement of the moisture resistance is stable to a certain degree. This is because the hygroscopic capacity of the BSG film is significantly affected by the presence of boron, specifically, the total amount of boron. By this point of view, the amount of boron WB of the passivation film 501 is preferably no less than 1.0 percent by weight.

Although not shown in the drawing, it does not mean that the amount of boron WB is preferably as large as possible. When the amount of boron WB is too large, the amount of the particles of boron increases such that boron is precipitated inside the passivation film 501, or on the surfaces of the passivation film 501 and the fourth interlayer insulating film 44 and the images projected from the precipitates appear on the picture to deteriorate picture quality. According to the present inventors' investigation, in this point, the amount of boron WB of the passivation film 501 is preferably no more than a certain degree, to be specific, no more than 7 percent by weight.

As mentioned above, according to the present exemplary embodiment, when the amount of boron WB of the passivation film 501 satisfies the condition 1 percent by weight≦WB≦7 percent by weight, it is possible to enhance the moisture resistance of the electro-optical device and to reduce or prevent picture quality of the electro-optical device from deteriorating.

Figure 8:
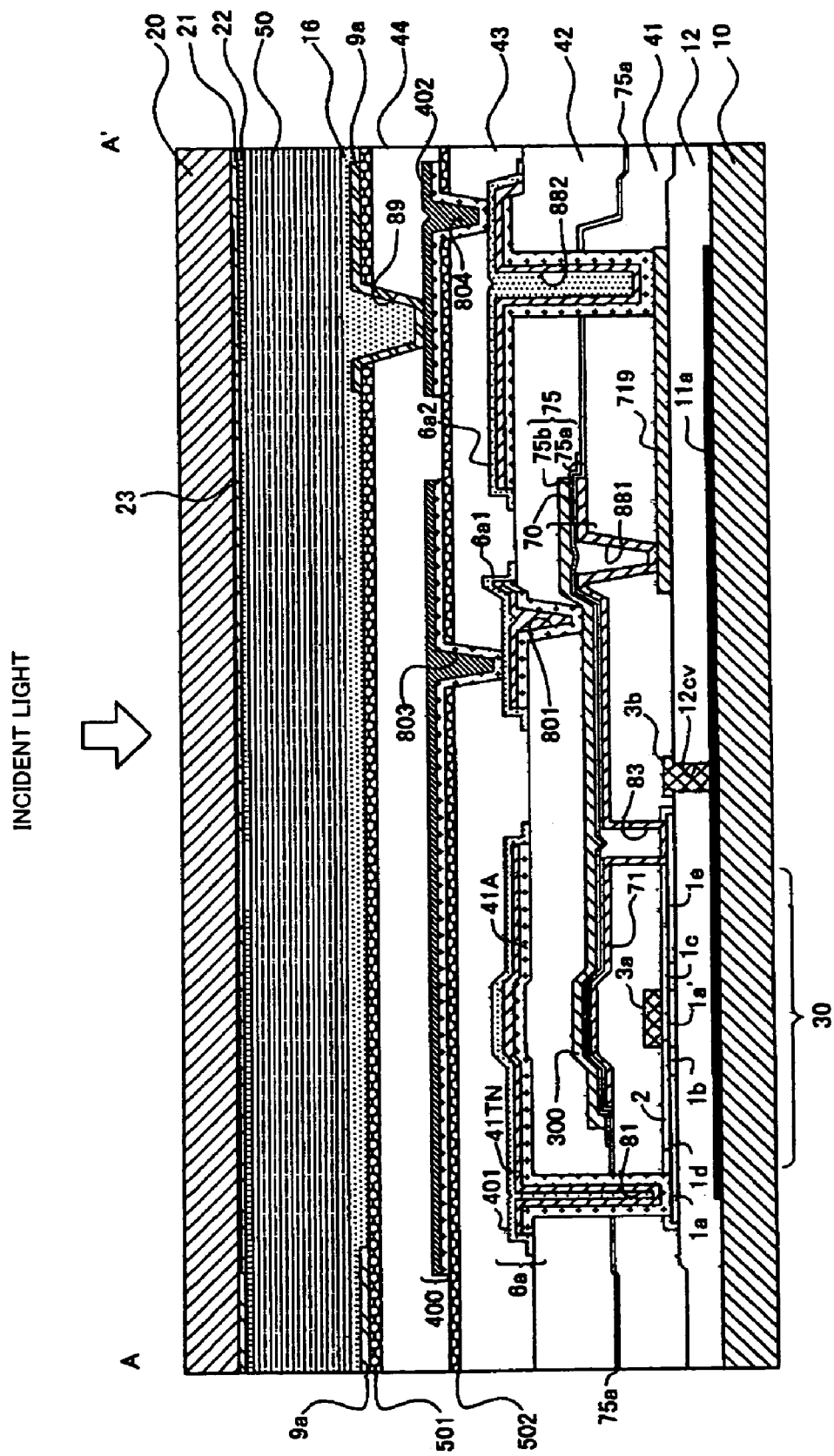
FIG. 8 is a schematic of an electro-optical device including a double passivation film according to another exemplary embodiment of the present invention but with the same purpose as FIG. 4.

According to the above-mentioned exemplary embodiment, the passivation film 501 is formed only on the fourth interlayer insulating film 44. However, the present invention is not limited to the above-mentioned. Passivation films may be formed to correspond to the other interlayer insulating films. In particular, since the CMP process is performed on the surface of the third interlayer insulating film 43 made of the NSG film, for example, as illustrated in FIG. 8, a passivation film 502 may be formed on the surface of the third interlayer insulating film. Instead of this or in addition to this, passivation films may be formed on the second interlayer insulating film 42 and on the first interlayer insulating film 41 (not shown).

When the passivation film is formed on the surface of the first interlayer insulating film 41, specifically, when the passivation film is formed between the first interlayer insulating film 41 and the second interlayer insulating film 42, attention must be paid, because the contact holes 81 that tie the semiconductor layers 1*a* to the data lines 6*a* and the contact holes 882 that tie the relay electrodes 719 to the second relay electrodes 6*a*2 exist as illustrated in FIG. 4. As illustrated in FIG. 4, it is necessary for the contact holes 81 and 882 to pass through the second interlayer insulating film 42 and the first interlayer insulating film 41. When the passivation film exists between the second interlayer insulating film 42 and the first interlayer insulating film 41, the etching rate changes between the second interlayer insulating film 42 and the passivation film or between the passivation film and the first interlayer insulating film 41, such that the contact holes 81 and the contact holes 882 cannot be appropriately formed. Thus, the passivation film is preferably, not formed between the second interlayer insulating film 42 and the first interlayer insulating film 41.

Method of Manufacturing Passivation Film

Figure 9:
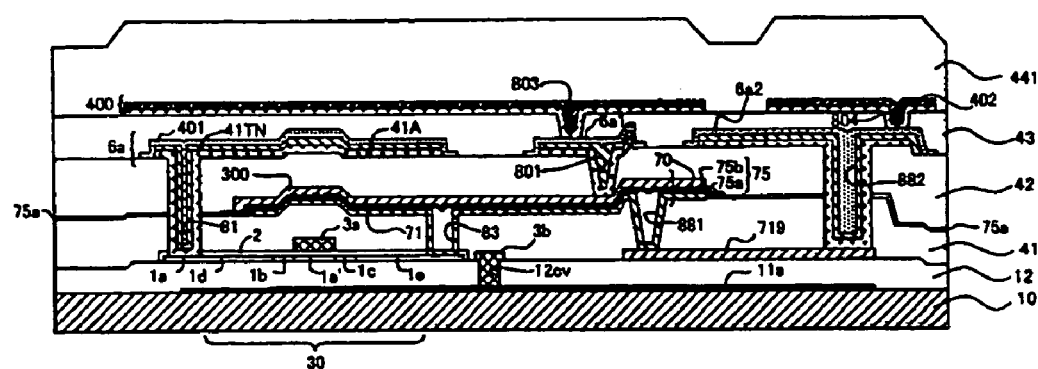
FIG. 9 is a schematic sequentially illustrating manufacturing processes of the electro-optical device according to the present exemplary embodiment shown in FIG. 4.
Figure 9:
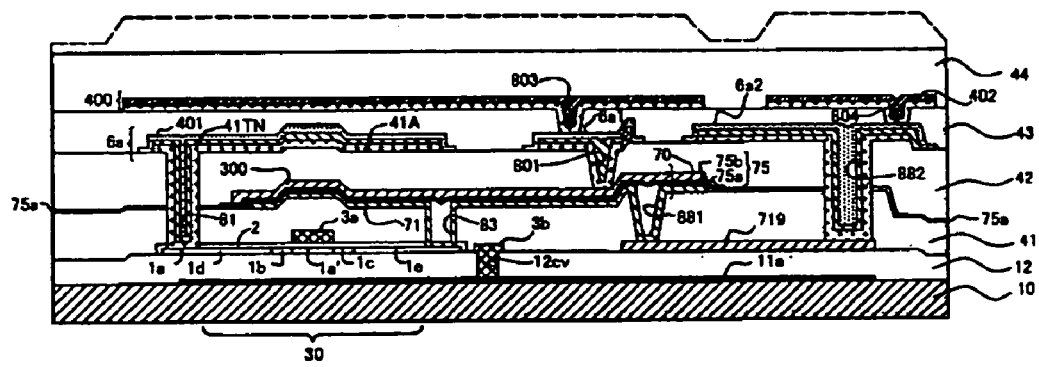
Figure 9:
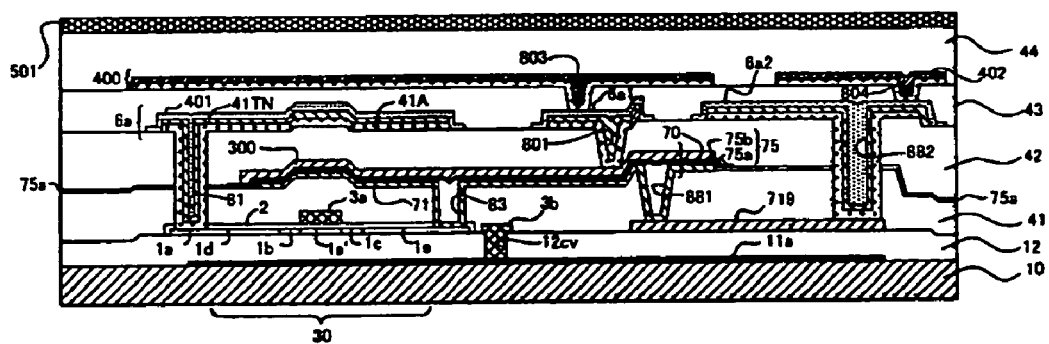
Figure 10:
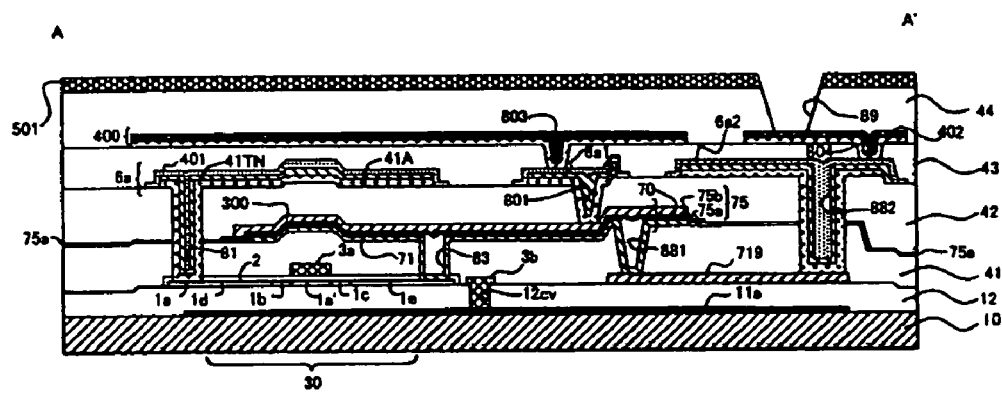
FIG. 10 is a schematic sequentially illustrating manufacturing processes of the electro-optical device according to the present exemplary embodiment shown in FIG. 4.
Figure 10:
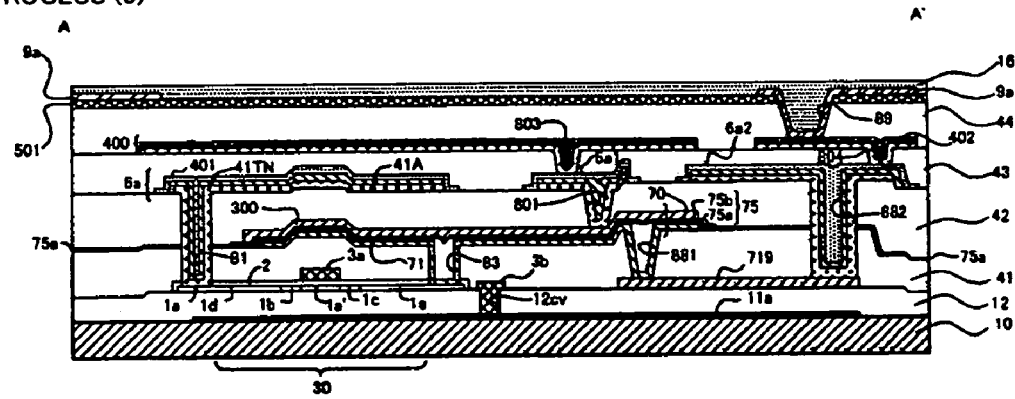

The passivation film 501 as mentioned above is manufactured as illustrated in FIGS. 9 and 10. FIGS. 9 and 10 are schematics illustrating the manufacturing processes of the electro-optical device according to the above-mentioned exemplary embodiment shown in FIG. 4. Hereinafter, only the manufacturing processes of the fourth interlayer insulating film 44 and the passivation film 501 related to the present invention will be described. In FIGS. 9 and 10, the structure on the side of the counter substrate 20 is not illustrated.

First, on the TFT array substrate 10, in the laminated structure formed to the capacitor wiring lines 400 by a related art method, as illustrated in the process (1) of FIG. 9, a precursor film 441 of the fourth interlayer insulating film 44 is formed on the capacitor wiring lines 400 by the plasma CVD method using the TEOS gas. The laminated structure which is formed to the capacitor wiring lines 400 is disposed in a predetermined portion in a chamber having an appropriate degree of vacuum, gases other than the TEOS gas are introduced to the chamber, and predetermined electric potential is provided between electrodes arranged in the chamber to face the laminated structure to generate plasma, such that a thin film is deposited on the surface of the laminated structure. In this case, the laminated structure may be maintained at a predetermined temperature (for example, about 400° C.). Instead of the above-mentioned process, the precursor film 441 may have a multi-layered structure, such as the silicon nitride film and the silicon oxide film or the silicon oxide film obtained by thermal oxidation and the silicon oxide film obtained by the CVD method. In this case, the fourth interlayer insulating film 44 to be described later has the multi-layered structure.

Next, as illustrated in the process (2) of FIG. 9, the CMP process is performed on the surface of the precursor film 441. The CMP process is a technology of contacting the surfaces of a processed substrate to the surface of abrasive cloth (pad), while rotating the processed substrate and the abrasive cloth, and of supplying an abrasive solution (slurry) including silica powder, etc. to the abutment-portion to abrade the surface of the processed substrate by the balance of the mechanical operation and the chemical operation, and to planarize the surface. According to the present exemplary embodiment, the processed substrate corresponds to the laminated structure manufactured by the process (1) of FIG. 9. Thus, the surface of the laminated structure is abraded and planarized as illustrated by the dashed line of the process (2) of FIG. 9. The precursor film 441 becomes the fourth interlayer insulating film 44 by the process (1) and the process (2) of FIG. 9.

According to an exemplary aspect of the present invention, as the planarization process, instead of or in addition to the CMP process, an etchback process and other planarization processes may be used. The etch back process is a technology of forming a flat film, such as a photoresist film or a spin on glass (SOG) film as a sacrificial film, on a surface having irregularity, and of etching the sacrificial film to the point of reaching the surface having irregularity (by doing so, the irregularity is to be even) to planarize the surface.

Next, as illustrated in the process (3) of FIG. 9, the passivation film 501 is formed on the fourth interlayer insulating film 44 by a normal pressure CVD method using the TEOS gas and an $O_3$ gas. To be more specific, by the normal pressure CVD, it is possible to appropriately manufacture the passivation film 501 made of the BSG film using a $N_2$ gas as a carrier gas and a triethyl borate (TEB) gas as an impurity gas, in addition to the TEOS gas and the $O_3$ gas. It is possible to control the amount of boron WB in the finally formed passivation film 501 by controlling the amount of the TEB gas among these gases. It is possible to control the thickness T of the passivation film 501 by controlling the time for which the passivation film 501 is formed. As mentioned above, it is possible to manufacture the passivation film 501 that satisfies the condition 10 nm≦T≦100 nm and 1 percent by weight≦WB≦7 percent by weight. When the passivation film is made of the PSG film, a trimethyl phospate (TMOP) gas may be used instead of the TEB gas. When it is considered that the passivation film 501 (refer to the process (3) of FIG. 10 or FIG. 3) formed on the entire surface may affect the transmittance, patterning may be performed such that an aperture is formed in the region of the passivation film 501 where the pixel electrodes 9a are to be formed, specifically, in a light transmissive region.

Next, as illustrated in the process (4) of FIG. 10, the contact holes 89 are formed by dry etching such as reactive ion etching, and reactive ion beam etching, or by wet etching using appropriate etchant.

Next, as illustrated in the process (5) of FIG. 10, after forming a precursor film of the pixel electrodes 9a, which is made of ITO, by a spattering method to fill the contact holes 89, and forming the pixel electrodes 9a by performing the photolithography process and the etching process to have a predetermined pattern (such that the finally formed pixel electrodes 9a are arranged in a matrix as illustrated in FIG. 3), the alignment film 16 is formed on the pixel electrodes 9a by a related art method to complete the manufacturing of the structure of the electro-optical device on the side of the TFT array substrate 10.

According to the above-mentioned exemplary embodiment, the passivation film 501 is formed on the fourth interlayer insulating film 44. However, the present invention is not limited to the above-mentioned. For example, as illustrated in FIG. 8, the passivation film 502 may be formed on the third interlayer insulating film 43.

Even if the passivation film is formed on the fourth interlayer insulating film 44, the passivation film is not directly formed on the fourth interlayer insulating film 44 but is formed, after forming the pixel electrodes 9a on the fourth interlayer insulating film 44. According to this aspect, since the passivation film is formed after performing the patterning process (including the etching process and a resistor peeling process) of forming the pixel electrodes 9a, it is possible to reduce the amount of damage to the passivation film compared to the aspect in which the pixel electrodes 9a are formed after forming the passivation film. Thus, according to the above-mentioned aspect, it is possible to more appropriately form the passivation film.

Structure of Electro-Optical Device

Figure 11:
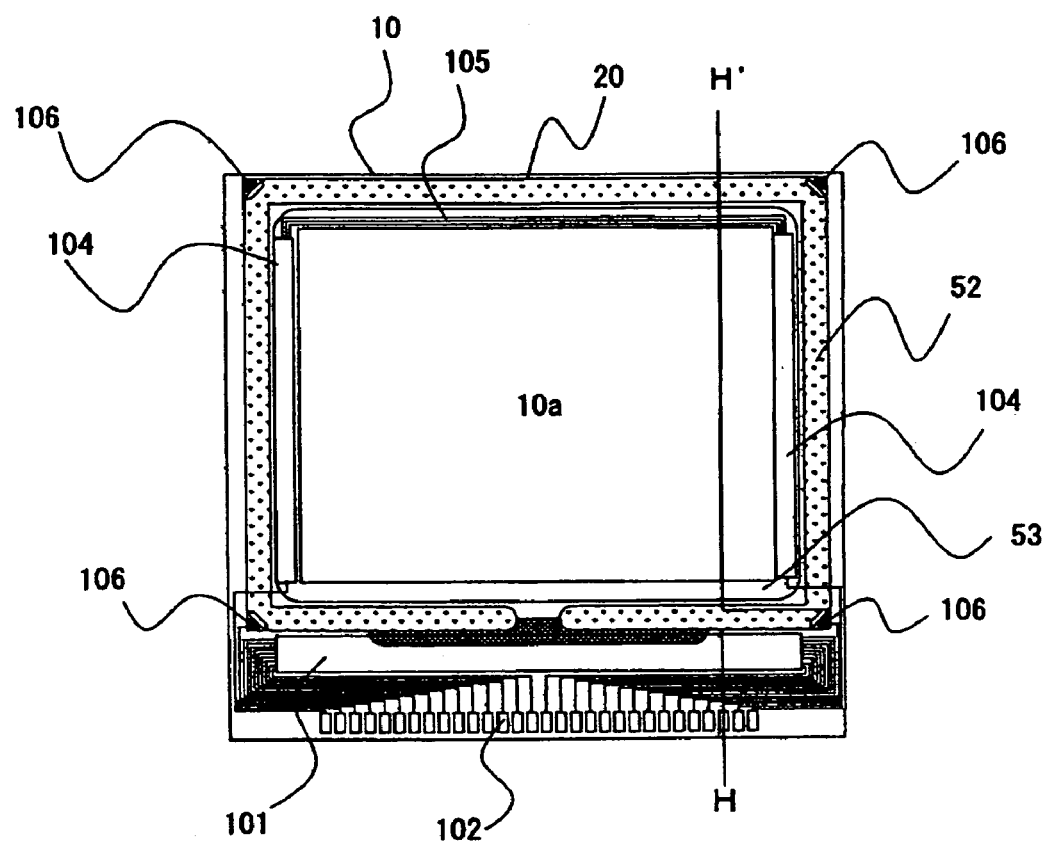
FIG. 11 is a schematic of an electro-optical device, in which the TFT array substrate is seen from the side of a counter substrate together, with the respective components formed thereon.
Figure 12:
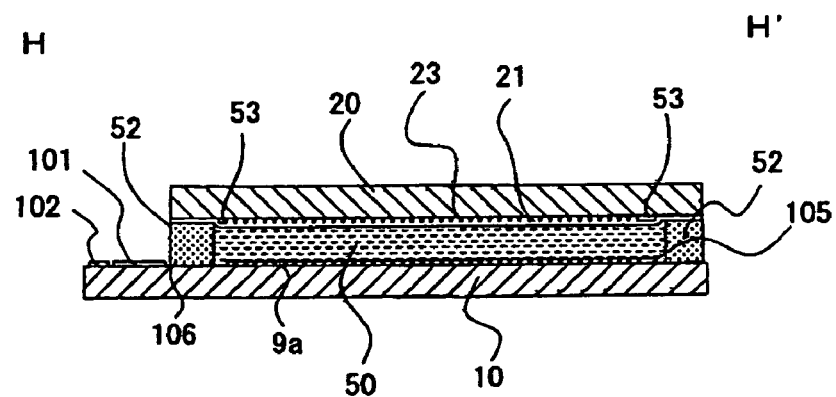
FIG. 12 is a sectional schematic taken along the plane H–H' of FIG. 11.

The structure of the electro-optical device according to the present exemplary embodiment will now be described with reference to FIGS. 11 and 12. FIG. 11 is a schematic of the electro-optical device, in which the TFT array substrate is seen, together with the respective components formed on the TFT array substrate, from the counter substrate. FIG. 12 is a schematic taken along the plane H–H' of FIG. 17. A liquid crystal device with a built-in driving circuit TFT active-matrix-driving mode, which is one example of the electro-optical device, is taken as an example.

In FIGS. 11 and 12, according to the electro-optical device of the present exemplary embodiment, the TFT array substrate 10 and the counter substrate 20 face each other. The liquid crystal layer 50 is sealed between the TFT array substrate 10 and the counter substrate 20. The TFT array substrate 10 and the counter substrate 20 are attached to each other by the sealing material 52 provided in the sealing region around the image display region 10a.

The sealing material 52 to attach the two substrates to each other is made of UV-hardening resin or thermosetting resin. The sealing material 52 is hardened by radiating UV rays onto, and heating the TFT array substrate 10 after being applied onto the TFT array substrate 10 with the sealing material 52 in the manufacturing processes. Gap materials, such as glass fibers or glass beads to make the TFT array substrate 10 and the counter substrate 20 separate from each other by a predetermined distance (a gap between the TFT array substrate 10 and the counter substrate 20) are scattered in the sealing material 52. The electro-optical device according to an exemplary aspect of the present invention is used for a light valve of a projector and is suitable to display small and enlarged images.

A frame-shaped light shielding film 53 that defines the frame region of the image display region 10a is provided on the side of the counter substrate 20 together with the sealing material 52 which is arranged inside the sealing. Part or all of the frame-shaped light shielding film 53 may be provided on the side of the TFT array substrate 10 as a built-in light shielding film. In a peripheral region beyond the frame-shaped light shielding film 53, in the region outside the sealing region in which the sealing material 52 is arranged, in particular, a data line driving circuit 101 and external circuit connection terminals 102 are provided along one side of the TFT array substrate 10. Scanning line driving circuits 104 are provided along two sides adjacent to the one side to be covered with the frame-shaped light shielding film 53. Furthermore, a plurality of wiring lines 105 are provided along the remaining one side of the TFT array substrate 10 to be covered with the frame-shaped light shielding film 53 in order to connect the two scanning line driving circuits 104 provided on both sides of the image display region 10a.

Upper and lower connecting materials 106 that function as upper and lower connecting terminals between the two substrates are arranged at four corners of the counter substrate 20. The upper and lower connecting terminals are provided in the TFT array substrate 10 in the regions facing the corners. Thus, the TFT array substrate 10 and the counter substrate 20 can be electrically connected to each other.

In FIG. 12, on the TFT array substrate 10, an alignment film is formed on the pixel electrodes 9a after the wiring lines, such as the pixel switching TFTs, the scanning lines, and the data lines, are formed. On the counter substrate 20, other than the counter electrodes 21, a light shielding film 23 in a matrix or in strips, and an alignment on the uppermost layer are formed. The liquid crystal 50 is made of liquid crystal obtained by mixing one kind or various kinds of nematic liquid crystal and has a predetermined alignment state between the pair of alignment films.

On the TFT array substrate 10 illustrated in FIGS. 11 and 12, in addition to the data line driving circuit 101 and the scanning line driving circuits 104, sampling circuits to sample image signals on image signal lines to supply the image signals to the data lines, precharge circuits to supply precharge signals of a predetermined voltage level to the plurality of data lines prior to the image signals, and test circuits to test the quality and defects of the electro-optical device during the manufacturing or on shipping, may be formed.

Electronic Apparatus

Figure 13:
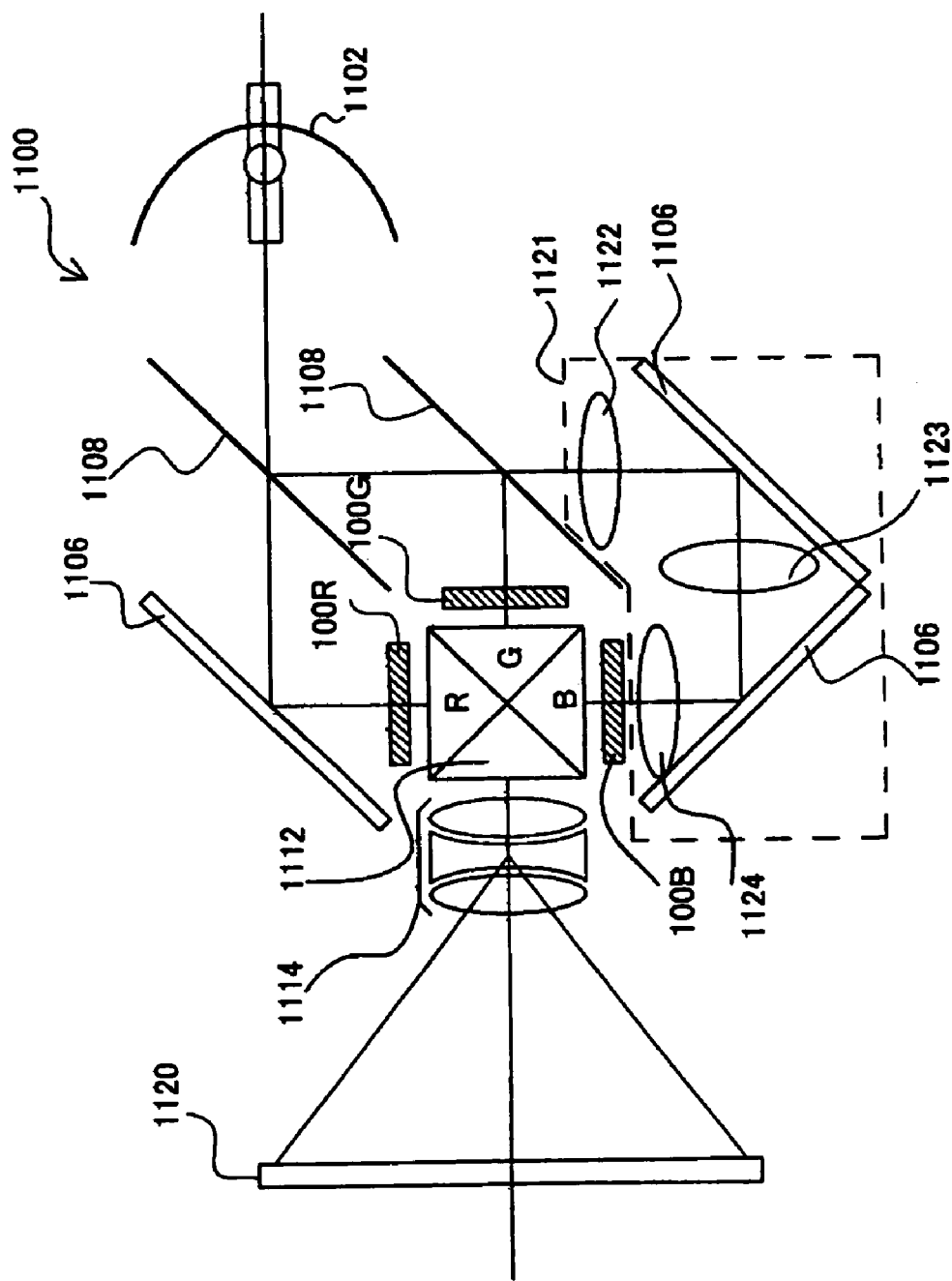
FIG. 13 is a schematic illustrating a color liquid crystal projector that is an example of a projection-type color display device according to an exemplary embodiment of an electronic apparatus of the present invention.

Next, the structure and, in particular, the optical structure of a projection-type color display device according to the present exemplary embodiment that is an example of an electronic apparatus using the above-mentioned electro-optical device as a light valve, will be described. FIG. 13 is a schematic of the projection-type color display device.

In FIG. 13, a liquid crystal projector 1100, which is an example of the projection-type color display device according to the present exemplary embodiment, has three liquid crystal modules each including a liquid crystal device in which a driving circuit is mounted on a TFT array substrate. The liquid crystal modules are used as RGB light valves 100R, 100G, and 100B. The above-mentioned electro-optical device (refer to FIGS. 1 to 5) is used as the light valves 100R, 100G, and 100B. In the liquid crystal projector 1100, when projection light is emitted from a lamp unit 1102 that is a white light source, such as a metal halide lamp, the emitted light is divided into light components R, G, and B corresponding to the three primary colors RGB, by three mirrors 1106 and two dichroic mirrors 1108 and the light components R, G, and B are received by the light valves 100R, 100G, and 100B corresponding to the respective colors. At this time, in particular, the light component B is received by a relay lens system 1121 composed of an incidence lens 1122, a relay lens 1123, and an emission lens 1124 in order to prevent optical loss from occurring due to the long light path. The light components corresponding to the three primary colors modulated by the light valves 100R, 100G, and 100B are combined by a dichroic prism 1112, and the combined light is projected onto a screen 1120 through a projection lens 1114 as a color image.

The present invention is not limited to the above-described exemplary embodiments and various changes in form and details may be made therein without departing from the spirit and scope of the invention. The electro-optical device, the method of manufacturing the same, and the electronic apparatus that accompany such changes are also included the scope of the present invention.

What is claimed is:

1. An electro-optical device, comprising:
    a substrate;
    a data line extending above the substrate;
    a scanning line extending in a direction intersecting the data line;
    a thin film transistor including a semiconductor layer and a gate electrode, the gate electrode being supplied with scanning signals by the scanning line;
    a pixel electrode supplied with image signals by the data line through the thin film transistor;
    an interlayer insulating film arranged beneath the pixel electrode;
    a passivation film arranged directly beneath the pixel electrode with no additional layer between the passivation film and the pixel electrode and directly on a surface of the interlayer insulating film with no additional layer between the passivation film-and the interlayer insulating film, the passivation film including at least one of boron or phosphorus; and
    a storage capacitor electrically connected to the thin film transistor and to the pixel electrode, and a capacitor wiring line to supply fixed electric potential to the storage capacitor;
    wherein:
    the interlayer insulating film includes a second interlayer insulating film on which the capacitor wiring line is laminated, under a first interlayer insulating film, and a third interlayer insulating film on which the data line is laminated, under the second interlayer insulating film, and
    a second passivation film including at least one of boron or phosphorus is arranged on a surface of the second interlayer insulating film or a surface of the third interlayer insulating film.

2. The electro-optical device according to claim 1, the passivation film including a material which is in a stable state in reaction to water.

3. The electro-optical device according to claim 2, the passivation film including a boron silicate glass (BSG) oxide film.

4. The electro-optical device according to claim 3, the amount of boron (B) in the BSG oxide film is no less than 1 percent by weight and no more than 7 percent by weight.

5. The electro-optical device according to claim 2, the passivation film including a phosphorus silicate glass (PSG) oxide film.

6. The electro-optical device according to claim 1, the thickness of the passivation film being no less than 10 nm and no more than 100 nm.

7. The electro-optical device according to claim 1, wherein:
    a planarization process being performed on the surface of the first interlayer insulating film and on the surface of the second interlayer insulating film, and
    the second passivation film being arranged on the surface of the second interlayer insulating film.

8. An electronic apparatus, comprising:
the electro-optical device according to claim 1.

9. The electro-optical device according to claim 1, further comprising a light-blocking shield layer disposed above the thin film transistor at a position between the data line and the pixel electrode, the light-blocking shield layer covering the data line and including a lower layer formed from aluminum and an upper layer formed from titanium nitride.

10. A method of manufacturing an electro-optical device, comprising:

extending a data line above a substrate;

extending a scanning line in a direction intersecting the data line;

forming a thin film transistor including a semiconductor layer and a gate electrode, the gate electrode being supplied with scanning signals by the scanning line;

forming a pixel electrode supplied with image signals by the data line through the thin film transistor;

forming an interlayer insulating film arranged beneath the pixel electrode;

forming a passivation film directly beneath the pixel electrode with no additional layer between the passivation film and the pixel electrode and directly on a surface of the interlayer insulating film with no additional layer between the passivation film and the interlayer insulating film, the passivation film including at least one of boron and phosphorous; and forming a storage capacitor electrically connected to the thin film transistor and to the pixel electrode, and a capacitor wiring line to supply fixed electric potential to the storage capacitor;

wherein:

the interlayer insulating film includes a second interlayer insulating film on which the capacitor wiring line is laminated, under a first interlayer insulating film, and a third interlayer insulating film on which the data line is laminated, under the second interlayer insulating film, and a second passivation film including at least one of boron or phosphorus is formed on a surface of the second interlayer insulating film or a surface of the third interlayer insulating film.

11. The method of manufacturing the electro-optical device according to claim 10, further including forming the passivation film by a normal pressure chemical vapor deposition (CVD) method.

12. The method of manufacturing the electro-optical device according to claim 10, further including forming the interlayer insulating film on which the passivation film is formed by a plasma CVD method.

* * * * *